United States Patent
Orita et al.

(10) Patent No.: US 8,141,392 B2
(45) Date of Patent: Mar. 27, 2012

(54) OPTICAL FIBER DRAWING METHODS AND DRAWING FURNACES

(75) Inventors: Nobuaki Orita, Tokyo (JP); Takashi Suzuki, Tokyo (JP); Yoshiyuki Sakata, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 280 days.

(21) Appl. No.: 12/408,854

(22) Filed: Mar. 23, 2009

(65) Prior Publication Data
US 2009/0241604 A1   Oct. 1, 2009

(30) Foreign Application Priority Data
Mar. 27, 2008   (JP) ................................. 2008-083512

(51) Int. Cl.
*C03B 37/02*   (2006.01)
*C03B 37/025*   (2006.01)
(52) U.S. Cl. ................. 65/435; 65/477; 65/533
(58) Field of Classification Search ............ 65/475, 65/477, 533, 535, 537, 539, 540
See application file for complete search history.

(56) References Cited

U.S. PATENT DOCUMENTS

| | | | |
|---|---|---|---|
| 4,428,760 A * | 1/1984 | Oh | 65/435 |
| 6,546,760 B1 | 4/2003 | Tsuchiya et al. | |
| 6,810,692 B2 * | 11/2004 | Taru et al. | 65/435 |
| 2002/0078715 A1 * | 6/2002 | Ishihara et al. | 65/477 |
| 2009/0038345 A1 * | 2/2009 | Otosaka et al. | 65/424 |

FOREIGN PATENT DOCUMENTS

| EP | 899243 A1 * | 3/1999 |
|---|---|---|
| JP | 62153137 A * | 7/1987 |
| JP | 2004-224587 | 8/2004 |

OTHER PUBLICATIONS

U.S. Appl. No. 12/709,681, filed Feb. 22, 2010, Suzuki, et al.

* cited by examiner

*Primary Examiner* — Matthew Daniels
*Assistant Examiner* — Lisa Herring
(74) *Attorney, Agent, or Firm* — Oblon, Spivak, McClelland, Maier & Neustadt, L.L.P.

(57) ABSTRACT

Drawing methods and drawing furnaces for drawing an optical fiber with small non-circularity by simple drawing system are provided. An optical fiber preform is received into a muffle tube and heated by a primary heater placed to surround the muffle tube. The optical fiber preform is heated such that a starting position of a meniscus portion is higher in its position than the top of the primary heater, wherein the meniscus portion is created at the bottom portion of the optical fiber preform.

2 Claims, 4 Drawing Sheets

US 8,141,392 B2

OPTICAL FIBER DRAWING METHODS AND DRAWING FURNACES

CROSS-REFERENCE TO RELATED APPLICATIONS

This application claims the benefit of priority from Japanese Patent Application No. 2008-083512 filed Mar. 27, 2008, the entire contents of which is incorporated herein by reference.

TECHNICAL FIELD

The present invention relates to optical fiber drawing methods and drawing furnaces for drawing an optical fiber from an optical fiber preform.

BACKGROUND OF THE INVENTION

An optical fiber is obtained by so-called "drawing". During draw, the bottom portion of an optical fiber preform is softened by heating, and the tension is applied to the softened portion of the preform to reduce its diameter. The preform is typically made from material such as quartz glass. In general, a drawing system for such a process is equipped with a drawing furnace to heat the optical fiber preform; a cooling device to cool the drawn glass optical fiber; a coating device to coat a resin around the drawn glass optical fiber; and a spooling device to spool the coated optical fiber. In addition, the drawing furnace is placed at the highest position possible from the ground to increase the travel distance for cooling the optical fiber and to increase the drawing speed for improving productivity.

However, when an optical fiber was drawn from a standard drawing system, sometimes cross section(s) of the optical fiber had non-isotropic circle (such as ellipse). Deviation of an optical fiber cross section from an isotropic circle is called "non-circularity". Non-circularity of an optical fiber is defined as (difference in the maximum and the minimum diameters of an optical fiber cross section)/(average of the maximum and the minimum diameters). An optical fiber is non-circular if its non-circularity is other than zero.

The cause of such non-circular optical fiber is unevenness in softness of an optical fiber preform in the circumferential direction due to unevenness of temperature distribution in the heated optical fiber preform, which happens because it is difficult to perfectly match the center axis of a drawing furnace to that of the optical fiber preform. Also, if the heat value of a heating element of the drawing furnace is uneven in the circumferential direction, the optical fiber could have a non-circular cross section. When an optical fiber has a large non-circularity, it causes problems such as an increase in polarization mode dispersion (PMD) and an increase in connection loss due to misalignment of the cores when the fiber is connected to another optical fiber.

To prevent non-circular optical fibers, drawing furnaces include equalization mean to uniformly distribute temperature along the heater circumference direction has been disclosed in U.S. Pat. No. 6,546,760. On the other hand, an optical fiber drawing method, which sets a relationship L (mm)≧5D (mm)−50 (mm), has been disclosed in Japanese Patent Application Laid-open No. 2004-224587. Where D is a diameter of an optical fiber preform and L is the length of the heat zone developed by the heater(s) along the drawing direction.

However, even with the methods disclosed in the U.S. Pat. No. 6,546,760, it is difficult to uniformly distribute the temperature around the circumference of the heater, and the structure of electrode within a furnace becomes complex. And, when the structure of the electrode is complex, it causes unevenness in the circumferential direction of the heating element, which causes uneven distribution of the heat. Further, with the methods disclosed in the Japanese Patent Application Laid-open No. 2004-224587, as the heater(s) is extended, the furnace itself needs to be extended, and it becomes difficult to receive an optical fiber preform into the drawing furnace, or the height of the drawing furnace and the distance for cooling down the drawn fiber are reduced. Those above problems are especially visible in a large optical fiber preform, such as a preform with a diameter of 100 mm or more.

SUMMARY OF THE INVENTION

The present invention provides optical fiber drawing methods and drawing furnaces, which are capable of drawing an optical fiber with a small non-circularity using a simple drawing system.

To solve the above problem, one of the optical fiber drawing methods disclosed in the present invention is a method of drawing an optical fiber from an optical fiber preform, wherein the optical fiber preform is received into a muffle tube and heated by a primary heater placed to surround the muffle tube, the method comprising the steps of heating the optical fiber preform such that a starting position of a meniscus portion, a portion from a starting position where the outer diameter of the optical fiber preform starts to decrease its outer diameter to a point where the outer diameter reaches to 1 mm, is higher in its position than the top of the primary heater, wherein the meniscus portion is created at the bottom portion of the optical fiber preform.

Also, one of the optical fiber drawing furnaces in the present invention comprises a muffle tube for receiving an optical fiber preform; a primary heater to heat the inside of the muffle tube, which is placed around the muffle tube concentrically with the muffle tube; and a furnace body to accommodate the muffle tube and the primary heater; wherein the optical fiber drawing furnace satisfies $2E \geqq L \geqq 1.5E$ where E is an inner diameter of the muffle tube and L is a distance between the highest temperature point and a point, which is 400° C. lower than the highest temperature and located in the upper side of the muffle tube.

According to the present invention, because uneven temperature distribution is reduced in the circumferential direction at a starting point of a meniscus portion, which causes the most impact in non-circularity of an optical fiber, an optical fiber with a small non-circularity can be drawn from a simple drawing system.

BRIEF DESCRIPTION OF THE DRAWINGS

Referring now to the drawings.

DETAILED DESCRIPTION

While various embodiments of the present invention are described below, it should be understood that they are presented by way of example, and are not intend to limit the scope of the presented invention.

First Embodiment of the Present Invention

Figure 1:
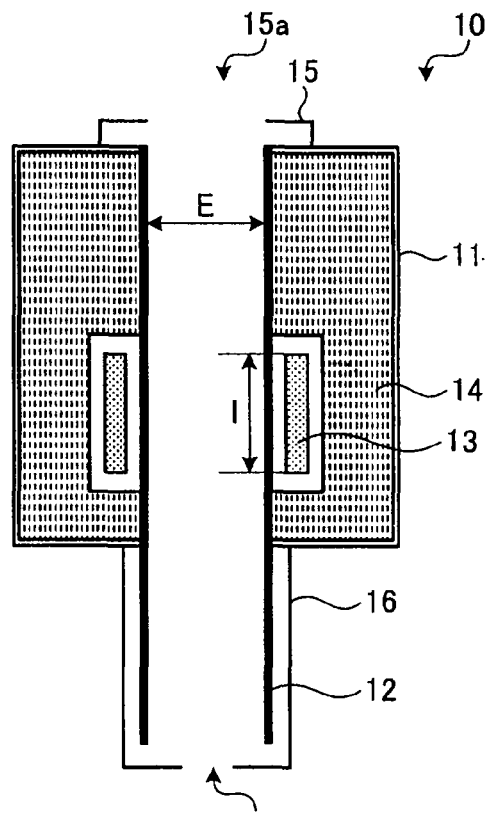
FIG. 1 is a schematic longitudinal cross section of an optical fiber drawing furnace, which is related to the first embodiment of the present invention.

FIG. 1 is a schematic longitudinal cross section of an optical fiber drawing furnace, which is related to the first embodiment of the present invention. As shown in FIG. 1, the drawing furnace 10 has a furnace body 11, a muffle tube 12, a heater 13 as a primary heater, insulator 14, a top cover 15, and a cooling section 16.

The furnace body 11 is a cylindrical shape, made from heat-resistant material, and includes the muffle tube 12, the heater 13 and the insulator 14. The muffle tube 12 is a cylindrical shape and made from carbon for example. Also, the heater 13, illustratively a carbon heater, is a cylindrical shape and is placed to cover the muffle tube 12. Also, the insulator 14 is placed around the outside of the muffle tube 12 and the heater 13. The top cover 15 is placed above the furnace body 11. The cooling section 16 is placed under the furnace body 11 and includes the bottom portion of the muffle tube 12. The top cover 15 and the cooling section 16 have a first opening 15a for receiving an optical fiber preform, and a second opening 16a for removing a drawn optical fiber. Also, in the first embodiment of the present invention, the inner diameter E of the muffle tube 12 is 150 mm, and the length I of the heater 13 is 250 mm.

Figure 2:
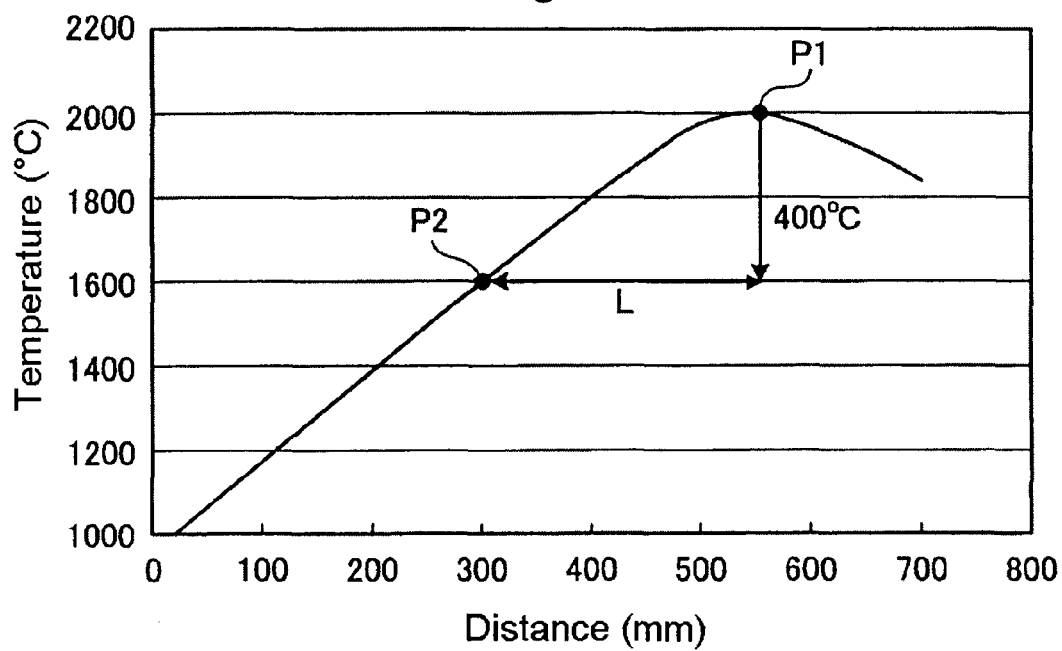
FIG. 2 shows temperature profile inside of the muffle tube in FIG. 1.

FIG. 2 shows temperature profile inside the muffle tube 12 of FIG. 1. In FIG. 2, the x-axis shows distance in the longitudinal direction of the muffle tube 12 as measured from the top end of the muffle tube, and the y-axis shows temperature at the center axis of the muffle tube 12. As shown in FIG. 2, in the first embodiment of the present invention, the highest temperature of the center portion of the heater 13 in respect to the longitudinal direction of the muffle tube 12 is approximately 2,000° C. Also, the distance L between the highest temperature point P1 and a point P2, which is 400° C. lower than the maximum temperature and located in the upper side of the muffle tube 12, is 250 mm. Therefore, in the first embodiment of the present invention, a relationship $2E \geqq L$ is satisfied. To satisfy the relationship, the inner diameter and the length of the muffle tube 12; the length and height of heater 13; and the insulator are selected.

Figure 3:
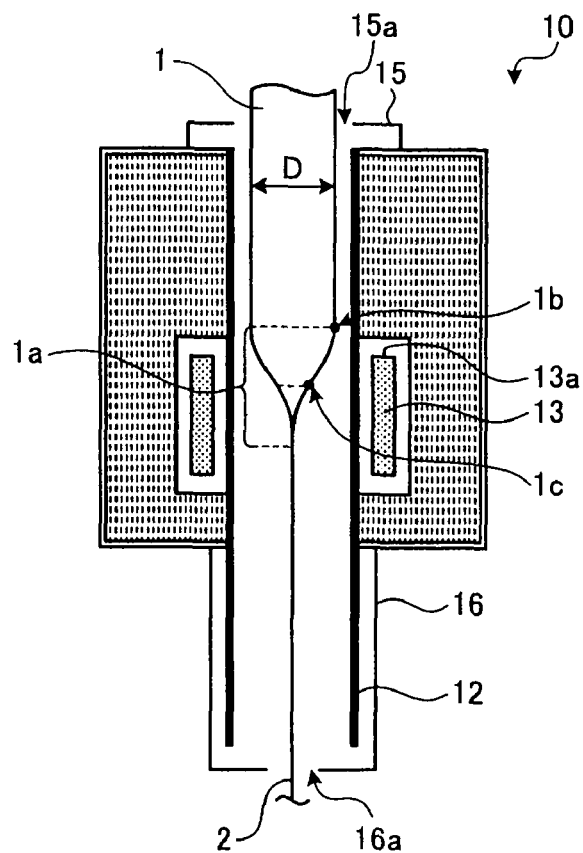
FIG. 3 explains a method of drawing an optical fiber preform using the drawing furnace shown in FIG. 2.

Next, a drawing method of an optical fiber preform using the drawing furnace 10 shown in FIG. 1 is explained. FIG. 3 is used to explain a method of drawing an optical fiber 2 from an optical fiber preform 1 using the drawing furnace 10 shown in FIG. 1. As shown in FIG. 3, at first, the optical fiber preform 1 is received from the top cover 15 on the first opening 15a. The heater 13 heats and softens the received optical fiber preform 1. The softened portion reduces its radius gradually to create a meniscus portion 1a, and then by reducing its outer diameter further to the predetermined diameter, it becomes an optical fiber 2. In this specification, the "meniscus portion 1a" means a portion from a starting position 1b where the outer diameter of the optical fiber preform 1 starts to decrease its outer diameter to a point where the outer diameter reaches to 1 mm. The meniscus portion 1a has an inflection point 1c where change of the outer diameter (in the longitudinal direction) becomes a concave shape from a convex shape.

As shown in FIG. 3, in the first embodiment of the present invention, the optical fiber preform 1 is heated such that the starting point 1b of the meniscus portion 1a is higher in its position than top of the heater 13. By doing so, the uneven temperature distribution in the circumference direction at the starting point 1b of the meniscus portion 1a is reduced. The starting point 1b has the most impact in the non-circularity of the optical fiber 2.

In other words, below the top 13a of the heater 13, the temperature distribution of the meniscus portion 1a in the circumferential direction is easily affected by an uneven heating value of the heater 13 in the circumferential direction. However, above the top 13a of the heater 13, the uneven heating value of the heater 13 is reduced. In addition, because the optical fiber preform 1 starts to soften at the starting point 1b of the meniscus portion 1a, if non-circular shape exists at the starting portion of the meniscus, it affects the shapes of the meniscus portion 1a and the optical fiber 2 in a later process.

Therefore, in the first embodiment of the present invention, an optical fiber with small non-circularity can be drawn because uneven temperature distribution in the circumferential direction at the starting point 1b of the meniscus portion 1a is reduced. Especially, when the diameter of the optical fiber preform is greater than 100 mm, the above effect is significant since the preform is easily affected by the unevenness of temperature distribution in the circumferential direction. In the specification, the diameter of the optical fiber preform means an outer diameter of a portion of the optical fiber preform where the outer diameter of the portion is approximately consistent. Also, in the first embodiment of the present invention, to achieve the starting point 1b of the meniscus portion 1a, it satisfies a relationship $2E \geqq L$, where L is a distance, which defines a temperature distribution of the muffle tube 12, and E is the inner diameter of the muffle tube 12. Therefore, the drawing furnace 10 composes of simple construction without need for special devices. As for the relationship between the distance L and the inner diameter E, if $2E \geqq L \geqq 1.5E$, then the starting point 1b of the meniscus portion 1a can be positioned above the top 13a of the heater 13 as described in the examples below.

Example 1

As an example 1 of the present invention, an optical fiber preform, made from quartz glass, was drawn in a furnace at a drawing tension of 100 gf and a drawing speed of 1,500 m/min. The furnace has the same composition as the first embodiment of the invention, and comprises a muffle tube with an inner diameter E of 150 mm and a heater length I of 250 mm. An optical fiber preform having a diameter D of 125 mm and an average non-circularity (measured every 50 mm in length of the preform) of 0.08% was used. The average non-circularity of the drawn optical fiber (measured every 50 km in length of the fiber) was 0.10%.

Example 2

As an example 2 of the present invention, an optical fiber preform, made from quartz glass, was drawn in a furnace at a drawing tension of 100 gf and a drawing speed of 1,500 m/min. The furnace has the same composition as the first embodiment of the invention, and comprises a muffle tube with an inner diameter E of 180 mm and a heater length I of 350 mm (100 mm longer than the drawing furnace in example 1). An optical fiber preform having a diameter D of 150 mm and an average non-circularity (measured every 50 mm in length of the preform) of 0.07% was used. The average non-circularity of the drawn optical fiber (measured every 50 km in length of the fiber) was 0.10%.

Comparative Example 1

As a comparative example 1 of the present invention, the muffle tube of the drawing furnace used in the example 1 was exchanged with the one having an inner diameter of 180 mm, and the optical fiber preform used in the example 2 was drawn at a drawing tension of 100 gf and a drawing speed of 1,500 m/min. The average non-circularity of the drawn optical fiber (measured every 50 km in length of the fiber) was 0.21%.

Figure 4:
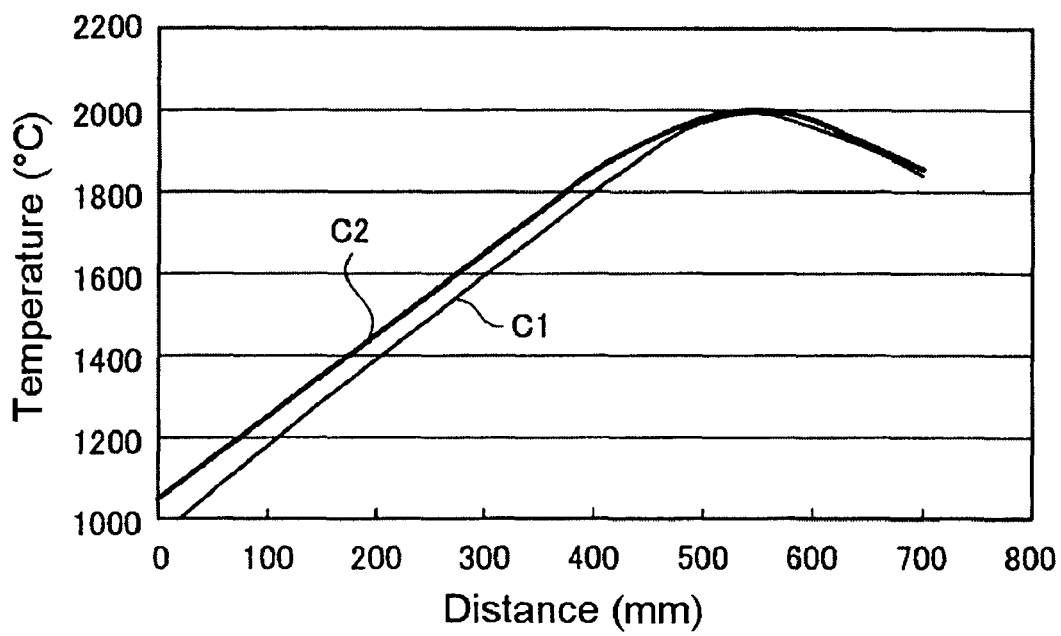
FIG. 4 shows temperature profiles inside of the muffle tubes in an example 1 and a comparative example 1 of the present invention.

FIG. 4 shows temperature profiles inside of the muffle tubes in example 1 and comparative example 1 of the present invention. In FIG. 4, the x-axis shows distance in the longitudinal direction of the muffle tubes as measured from the top end of the muffle tube, and the y-axis shows temperature at the center axis of the muffle tube. Curve C1 shows the case in example 1 and curve C2 shows the case in comparative example 1. As shown in FIG. 4, in example 1, because the inner diameter E is 150 mm and the distance L is 250 mm, the relationship $2E \geq L \geq 1.5E$ is satisfied. Contrary, in comparative example 1, since the inner diameter E was 180 mm and the distance L was 265 mm, the relationship $2E \geq L \geq 1.5E$ is not satisfied.

Comparative Example 2

As a comparative example 2 of the present invention, an optical fiber preform, made from quartz glass, was drawn at a drawing tension of 100 gf and a drawing speed of 1,500 m/min. An optical fiber preform having a diameter D of 150 mm (as in example 2) and an average non-circularity (measured every 50 mm in length of the preform) of 0.08%, was used. As for the muffle tube, it has the same composition as the first embodiment of the invention, i.e., an inner diameter E of 180 mm and a heater length I of 250 mm. However, since the distance from the top of the heater to the top of the muffle tube is reduced, the distance L became 230 mm, and the meniscus starting point was approximately at the same location as the top of the heater. The average non-circularity of the drawn optical fiber (measured every 50 km in length of the fiber) was 0.25%.

Figure 5:
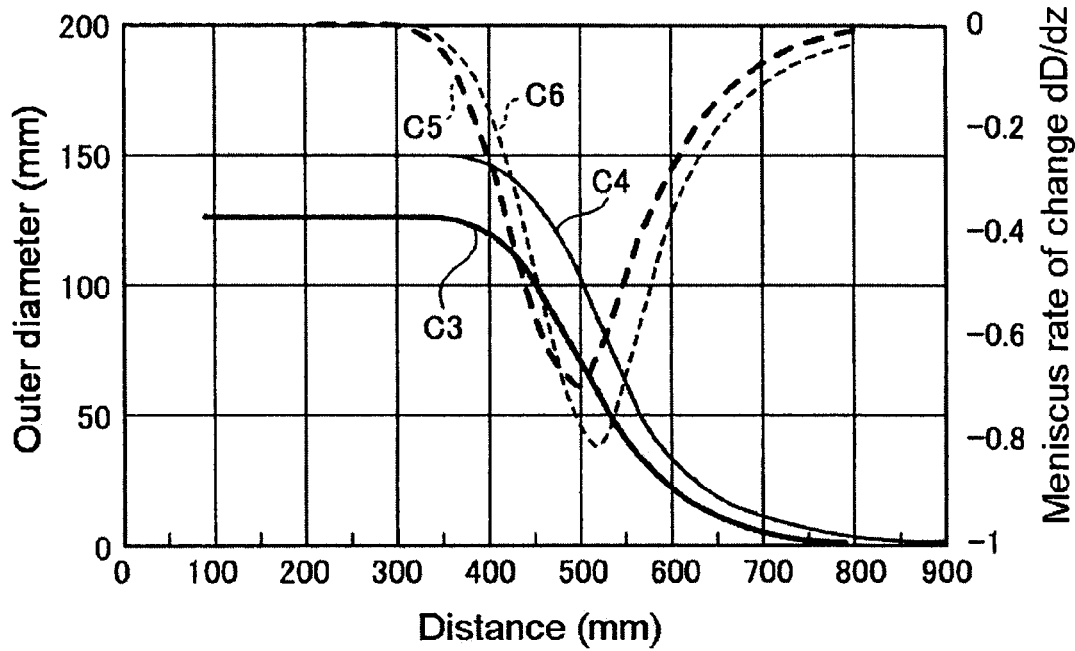
FIG. 5 shows shapes of the meniscus portions of the optical fiber preform in an example 1 and a comparative example 1 of the present invention.

FIG. 5 shows shapes of the meniscus portions of the optical fiber preform in example 1 and comparative example 1. In FIG. 5, the x-axis shows distance in the longitudinal direction of the muffle tubes as measured from the top of the muffle tube, the left y-axis shows the outer diameter of the optical fiber preform, and the right y-axis shows the meniscus rate of change dD/dz of preform outer diameter. Curves C3 and C4 respectively represent the outer diameters D of example 1 and comparative example 1. Curves C5 and C6 respectively represent the meniscus rate of change dD/dz in example 1 and comparative example 1. When a distance N from a meniscus starting point to an inflection point was calculated, it was 200 mm. Since the diameter D of example 1 is 125 mm, example 1 satisfied the relationship $N \geq 1.5$ D. On the other hand, the distance N in the comparative example 1 is 220 mm. Since the diameter D of comparative example 1 is 150 mm, this comparative example does not satisfy the relationship $N \geq 1.5$ D. Also, lengths of the meniscus portions of example 1 and comparative example 1 are 490 mm and 580 mm, respectively. The absolute value of the meniscus rate of change dD/dz is maximized at the inflection point. The maximum values of the meniscus rate of change dD/dz in example 1 and comparative example 1 are 0.70 and 0.82, respectively.

In accordance with the above results, as it was in example 1, if the maximum absolute value of a meniscus rate of change dD/dz in an optical fiber preform is less than 0.8, and the preform satisfies the relationship $N \geq 1.5$ D, where D is a diameter of the preform in mm and N is a distance from a meniscus starting point to an inflection point in mm, then an optical fiber with small non-circularity can be obtained. Because the above conditions also reduce the length of the meniscus portion, the drawing furnace can be made smaller.

Furthermore, the drawing furnace of the present invention does not limited to the configuration disclosed in above example 1. It has various alternative embodiments. Below, alternative embodiments of example 1 are disclosed.

Alternative Embodiment 1

Figure 6:
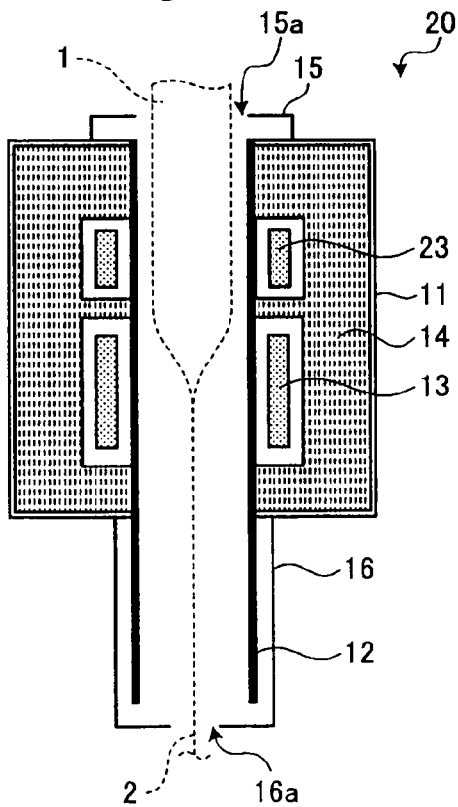
FIG. 6 is a schematic longitudinal cross section of an optical fiber drawing furnace, which is related to the alternative embodiment 1 of the present invention.

FIG. 6 is a schematic longitudinal cross section of an optical fiber drawing furnace, which is related to alternative embodiment 1 of the present invention. As shown in FIG. 6, the drawing furnace 20 has a furnace body 11, a muffle tube 12, a heater 13, insulator 14, a top cover 15, which has a first opening 15a to receive an optical fiber preform, and a cooling section 16, which has a second opening 16a to remove drawn optical fiber, as in the drawing furnace 10. Furthermore, the drawing furnace 20 has a sub-heater 23, which is placed above the heater 13 and covers the muffle tube 12. The sub heater 23 has less power compared to the heater 13, which for example, is used to increase maximum temperature to approximately 1,600° C. within the muffle tube 12. It has simple construction and provides heat value evenly in the circumferential direction. Also, the heater 13 and the sub-heater 23 are separated by insulator 14 so that they can be controlled independently. Because the drawing furnace 20 has a sub heater 23, it can satisfy the relationship $2E \geq L \geq 1.5E$, where E is the inner diameter of the muffle tube 12 and L is a distance defined the temperature distribution of the muffle tube 12. Therefore, when an optical fiber preform 1 (shown by dotted line in FIG. 6) is drawn by the drawing furnace 20, an optical fiber 2 with small non-circularity can be drawn.

Alternative Embodiment 2

Figure 7:
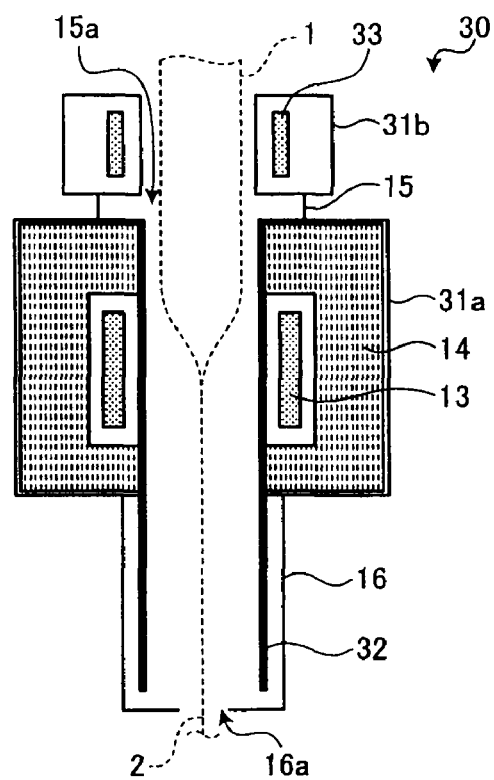
FIG. 7 is a schematic longitudinal cross section of an optical fiber drawing furnace, which is related to the alternative embodiment 2 of the present invention.

FIG. 7 is a schematic longitudinal cross section of an optical fiber drawing furnace, which is related to alternative embodiment 2 of the present invention. As shown in FIG. 7, a drawing furnace 30 has a shorter body 31a than the body 11 of furnace 10; a muffle tube 32; and a heater 13; insulator 14; a top cover 15, which has a first opening 15a to receive an optical fiber preform; and a cooling section 16, which has a second opening 16a to remove drawn optical fiber, as in furnace 10. Furthermore, the drawing furnace 30 has another furnace body 31b above the top cover 15 and outside of the furnace body 31a. The furnace body 31b is concentric with the heater 13, and it includes a sub-heater 33. The sub-heater 33 has less power than heater 13, and it can be used in ambient atmosphere by using a Kanthal heater. For example, it is used to increase maximum temperature to approximately 1,600° C. within the muffle tube 32. It has a simple construction and provides heat value evenly in the circumferential direction.

Drawing furnace 30 (as in alternative embodiment 1) can satisfy the relationship $2E \geq L \geq 1.5E$, where E is the inner diameter of the muffle tube 32 and L is a distance defined the temperature distribution of the muffle tube 32. Therefore, an optical fiber 2 with small non-circularity can be drawn from an optical fiber preform 1.

Alternative Embodiment 3

Figure 8:
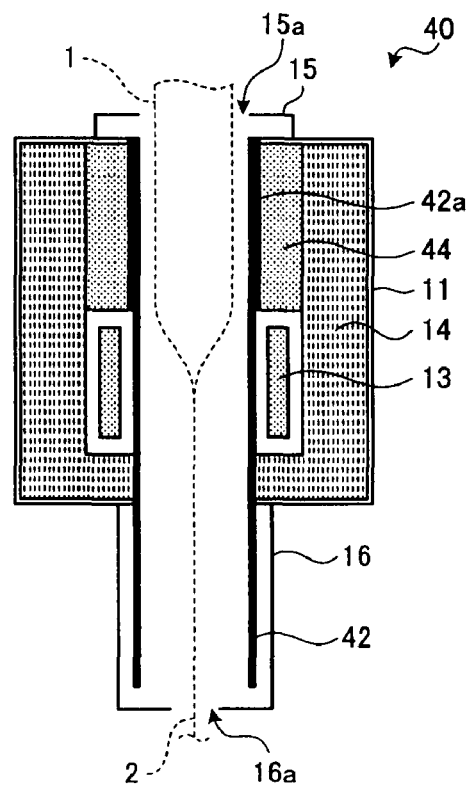
FIG. 8 is a schematic longitudinal cross section of an optical fiber drawing furnace, which is related to the alternative embodiment 3 of the present invention.

FIG. 8 is a schematic longitudinal cross section of an optical fiber drawing furnace, which is related to the alternative embodiment 3 of the present invention. As shown in FIG. 8, the drawing furnace 40 has a furnace body 11; a heater 13; insulator 14; a top cover 15, which has a first opening 15a to receive an optical fiber preform; and a cooling section 16, which has a second opening 16a to remove a drawn optical fiber, as in furnace 10. A muffle tube 42 is similar to muffle tube 12. However, the muffle tube 42 has a thick tube portion 42a, which is thicker than the adjacent portion of the heater 13 that is positioned on top of the heater 13. Furthermore, the drawing furnace 40 has insulator 44, which has higher thermal conductivity than the insulator 14, on top of the heater 13. Because of the thick tube portion 42a and the insulator 44, the drawing furnace 40 (as in the alternative embodiments 1 and 2) can satisfy the relationship $2E \geq L \geq 1.5E$, where E is the inner diameter of the muffle tube 42 and L is a distance defined the temperature distribution of the muffle tube 42. Therefore, an optical fiber 2 with low non-circularity can be drawn from an optical fiber preform 1.

Examples 3-5

As examples 3-5, optical fibers were drawn from the above alternative embodiments 1-3 at a drawing tension of 100 gf and a drawing speed of 1,500 m/min. The inner diameters E of the muffle tubes are 180 mm. The optical fibers were drawn from an optical fiber preform, which had a diameter D of 150 mm and an average non-circularity (measured every 50 mm in length of the preform) of 0.07%. A table below shows distance L; distance N; maximum absolute value of meniscus rate of change $(dD/dz)_{max}$; and non-circularity measured every 50 km in length of the drawn fibers. As shown in the above table, in all examples 3-5, $(dD/dZ)_{max}$ were equal to or less than 0.8, $N \geq 1.5D$, and non-circularities were small.

|  | L (mm) | N (mm) | $(dD/dz)_{max}$ | Non-circularity (%) |
|---|---|---|---|---|
| Example 3 | 300 | 290 | 0.77 | 0.12 |
| Example 4 | 330 | 300 | 0.76 | 0.09 |
| Example 5 | 270 | 270 | 0.8 | 0.11 |

What is claimed is:

1. A method of drawing an optical fiber from an optical fiber preform, wherein the optical fiber preform is received into a muffle tube and heated by a heater placed to surround the muffle tube, the method comprising:
    heating the optical fiber preform such that a starting position of a meniscus portion is higher in its position than the top of the heater, the heater being an uppermost heater, wherein the meniscus portion is created at the bottom portion of the optical fiber preform,
    wherein the heater contributes to formation of the meniscus portion,
    wherein the optical fiber preform is made of silica glass and a diameter of the optical fiber preform is equal to or greater than 100 mm,
    wherein an outer diameter of the meniscus portion in a longitudinal direction includes a convex shape, a concave shape, and an inflection point between the convex shape and the concave shape, and
    wherein the optical fiber preform is heated such that the maximum absolute value of a rate of change in the outer diameter of the meniscus portion of the optical fiber preform in the longitudinal direction at the inflection point is equal to or less than 0.8.

2. The method of drawing an optical fiber in claim 1, wherein the optical fiber preform is heated such that it satisfies the relationship N is equal to or greater than to 1.5D, where D is the diameter of the preform in mm and N is a distance from the meniscus starting point to an inflection point in mm.

* * * * *